US012350531B2

(12) United States Patent
Boraas

(10) Patent No.: US 12,350,531 B2
(45) Date of Patent: Jul. 8, 2025

(54) IMPACT INDICATOR FOR A FALL-PROTECTION APPARATUS, AND METHOD OF USING

(71) Applicant: 3M INNOVATIVE PROPERTIES COMPANY, St. Paul, MN (US)

(72) Inventor: Michael A. Boraas, Zumbrota, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1263 days.

(21) Appl. No.: 17/057,519

(22) PCT Filed: May 21, 2019

(86) PCT No.: PCT/IB2019/054207

§ 371 (c)(1),
(2) Date: Nov. 20, 2020

(87) PCT Pub. No.: WO2019/224728

PCT Pub. Date: Nov. 28, 2019

(65) Prior Publication Data

US 2021/0196996 A1 Jul. 1, 2021

Related U.S. Application Data

(60) Provisional application No. 62/675,255, filed on May 23, 2018.

(51) Int. Cl.
*A62B 35/00* (2006.01)

(52) U.S. Cl.
CPC ...... *A62B 35/0075* (2013.01); *A62B 35/0093* (2013.01)

(58) Field of Classification Search
CPC ............ A62B 35/0068; A62B 35/0075; A62B 35/0093; A62B 35/04; G01L 5/0052; F16B 2200/63
(Continued)

(56) References Cited

U.S. PATENT DOCUMENTS 3,949,451 A * 4/1976 Bunn .................... F16B 45/026 182/4
5,220,977 A * 6/1993 Wolner .............. A62B 35/0037 182/18
(Continued)

FOREIGN PATENT DOCUMENTS

CN 202961570 6/2013
EP 0 212 826 11/1989
(Continued)

OTHER PUBLICATIONS

3M DBI-SALA, Flexiguard Solutions, Full Line Catalog, Fall 2016, 9 pages.
(Continued)

*Primary Examiner* — Daniel P Cahn
*Assistant Examiner* — Shiref M Mekhaeil
(74) *Attorney, Agent, or Firm* — Kenneth B. Wood

(57) ABSTRACT

An impact indicator for a fall-protection apparatus. The indicator includes a deflectable element that is deflectable to allow movement of a movable component of the impact indicator from a first, non-indicating position to a second, indicating position. Also disclosed are kits, methods and systems that use impact indicators and that facilitate installation of a replacement impact indicator in the field.

8 Claims, 6 Drawing Sheets

(58) Field of Classification Search
USPC .......................................................... 182/231
See application file for complete search history.

(56) References Cited

U.S. PATENT DOCUMENTS

| | | | | |
|---|---|---|---|---|
| 5,267,758 | A * | 12/1993 | Shah .................. F16L 33/2076 285/259 |
| 6,472,600 | B1 * | 10/2002 | Osmani .................... H02G 1/14 174/75 R |
| 7,843,349 | B2 | 11/2010 | Rohlf |
| 8,074,489 | B2 * | 12/2011 | Ishikawa ................. G01P 15/03 73/12.05 |
| 8,228,206 | B2 * | 7/2012 | Manahan ............... H01H 9/161 340/626 |
| 8,234,994 | B1 * | 8/2012 | Branch ................. G01L 5/0052 116/203 |
| 8,256,574 | B2 | 9/2012 | Griffiths |
| 8,430,206 | B2 | 4/2013 | Griffiths |
| 8,430,207 | B2 | 4/2013 | Griffiths |
| 8,739,929 | B2 * | 6/2014 | Meillet .............. A62B 35/0093 254/368 |
| 9,056,753 | B2 * | 6/2015 | Luntz ..................... B66D 3/046 |
| 9,488,235 | B2 | 11/2016 | Casebolt |
| 10,928,260 | B2 * | 2/2021 | Johnson .................... G01L 1/26 |
| 11,041,770 | B2 * | 6/2021 | Fonk ..................... H04L 9/3239 |
| 2002/0151370 | A1 * | 10/2002 | Pratt ....................... F16B 43/00 470/41 |
| 2004/0031644 | A1 * | 2/2004 | Kurtgis .............. A62B 35/0075 182/3 |
| 2004/0118720 | A1 * | 6/2004 | Powers ................... F16B 43/00 206/346 |
| 2004/0251056 | A1 * | 12/2004 | McCauley ........... G01G 23/005 177/1 |
| 2008/0041661 | A1 * | 2/2008 | Meillet .............. A62B 35/0056 182/13 |
| 2010/0147624 | A1 * | 6/2010 | Caylor ............... A62B 35/0068 182/129 |
| 2011/0090079 | A1 * | 4/2011 | Morino .............. A62B 35/0075 340/532 |
| 2012/0117786 | A1 * | 5/2012 | Asakura .............. F16B 19/1063 411/15 |
| 2012/0260490 | A1 * | 10/2012 | Sakoda ............... F16B 19/1045 411/34 |
| 2014/0284150 | A1 * | 9/2014 | Chantelois .......... E04G 21/3204 188/65.2 |
| 2017/0128756 | A1 | 5/2017 | Schurian |
| 2017/0252591 | A1 * | 9/2017 | Hetrich .............. B65H 75/4436 |
| 2017/0291049 | A1 * | 10/2017 | Hetrich .............. A62B 35/0075 |
| 2017/0309151 | A1 * | 10/2017 | Ulner ................... G08B 25/016 |
| 2017/0374436 | A1 | 12/2017 | Awiszus |
| 2018/0028844 | A1 * | 2/2018 | Wu .................... B65H 75/4439 |
| 2018/0107169 | A1 | 4/2018 | Hu |
| 2019/0083825 | A1 * | 3/2019 | Huseth .................. F16B 45/028 |
| 2019/0118011 | A1 * | 4/2019 | Patton ..................... F16G 11/12 |
| 2020/0276463 | A1 * | 9/2020 | Newing ................ E04G 21/329 |
| 2021/0046340 | A1 * | 2/2021 | Miller ..................... E06C 7/186 |
| 2021/0123467 | A1 * | 4/2021 | Takeda .................. F16B 13/061 |
| 2022/0088425 | A1 * | 3/2022 | Miller ..................... A62B 35/04 |
| 2023/0271038 | A1 * | 8/2023 | Schrank ............. A62B 35/0093 182/232 |

FOREIGN PATENT DOCUMENTS

| | | | |
|---|---|---|---|
| EP | 0557031 | | 8/1993 |
| JP | 2004097691 | | 4/2004 |
| KR | 101441049 | B * | 1/2013 |
| KR | 10-1441049 | | 9/2014 |
| KR | 10-1441049 | B1 | 9/2014 |
| WO | WO 2012/063064 | | 5/2012 |
| WO | WO 2017/116501 | | 7/2017 |
| WO | WO 2017-180121 | | 10/2017 |
| WO | WO 2017/180597 | | 10/2017 |
| WO | WO 2017-223476 | | 12/2017 |
| WO | WO 2018-150299 | | 8/2018 |
| WO | WO 2019-012454 | | 1/2019 |
| WO | WO 2019-030708 | | 2/2019 |
| WO | WO 2019-051349 | | 3/2019 |

OTHER PUBLICATIONS

Standard/Regulation Information: "Safety Requirements for Self-Retracting Devices—ANSI Z359.14-2012" Capital Safety USA, Dec. 2012, 3 pages.

International Search Report for PCT International Application No. PCT/IB2019/054207, mailed on Oct. 30, 2019, 3 pages.

* cited by examiner

IMPACT INDICATOR FOR A FALL-PROTECTION APPARATUS, AND METHOD OF USING

CROSS REFERENCE TO RELATED APPLICATIONS

This application is a national stage filing under 35 U.S.C. 371 of PCT/IB2019/054207, filed May 21, 2019, which claims the benefit of provisional Application No. 62/675,255, filed May 23, 2018, the disclosure of which is incorporated by reference in its/their entirety herein.

BACKGROUND

Fall-protection apparatus such as e.g. self-retracting lifelines have often found use in applications such as building construction and the like.

SUMMARY

In broad summary, herein are disclosed impact indicators for fall-protection apparatus. Such indicators can include a deflectable element that is deflectable to allow movement of a movable component of the impact indicator from a first, non-indicating position to a second, indicating position. Also disclosed are kits, methods and systems that use impact indicators and that facilitate installation of replacement impact indicators in the field. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. All figures and drawings in this document will be understood to be generic representations for the purpose of illustrating different embodiments of the invention and are not necessarily to scale. Thus, in the Figures the dimensions of the various items and components are depicted in illustrative terms only, and no relationship between the dimensions of the items and components should be inferred from the drawings, unless so indicated. Terms such as "top", bottom", "upper", lower", "under", "over", "up", "down", and the like are used for convenience of description with reference to the views depicted in the Figures herein and do not require any particular orientation with respect to the Earth. Use of words such as "sleeve", "radial", "radially", "encircle", and similar terms does not necessitate that the component that is referred to must exhibit a strictly circular geometry, unless specified.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. Terms such as "configured to", "configured so that", and similar characterizations are understood to require actual design intention to perform the specified function rather than mere physical capability of performing such a function.

DETAILED DESCRIPTION

Figure 1:
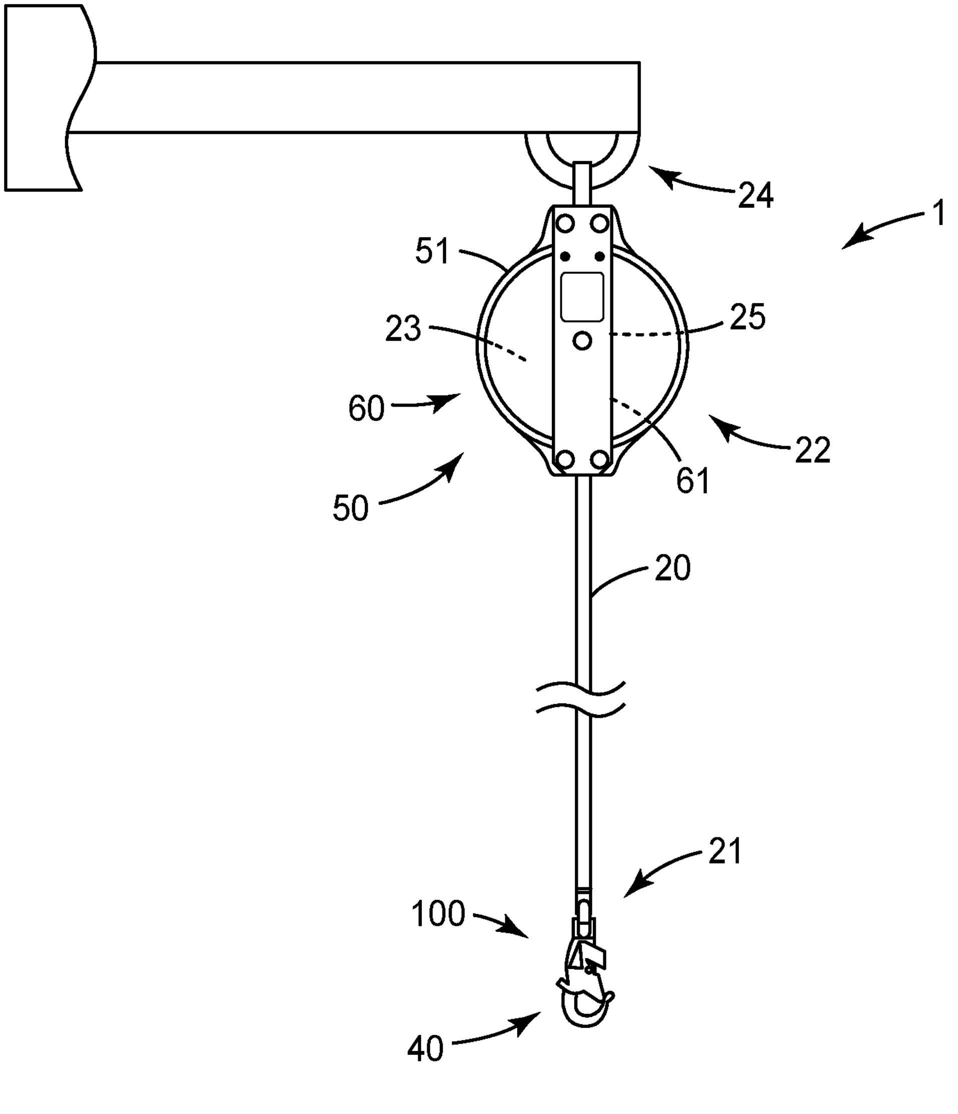
FIG. 1 is a side view of an exemplary fall-protection apparatus.

Disclosed herein is a field-installable deflectable element that can serve as a component of an impact indicator of a fall-protection apparatus. In some embodiments, a fall-protection apparatus may be a so-called self-retracting lifeline 1 as shown in generic exemplary embodiment in FIG. 1. Ordinary artisans will understand that a self-retracting lifeline comprises a load-bearing cable 20 that can be unwound from a base unit 50 which may be secured to an anchorage 24 (e.g. of a building under construction). A first end 21 of cable 20 may be connectable, e.g. by way of a connector 100, to a harness or like item of a human user of apparatus 1. Base unit 50 may comprise a housing 51 with a reel (drum) 23 to which a second end 22 of cable 20 is attached. Cable 20 can be unwound from reel 23 of base unit 50 to follow a user as the user moves about a workplace, with reel 23 being biased so that the reel retracts cable 20 back into housing 51 and rewinds it onto reel 23 as the user moves toward base unit 50. Apparatus 1 (e.g. housing 51 and reel 23 thereof) can include a brake (e.g. a centrifugal brake) 25 that is triggered in the event of rapid unwinding of cable 20 (e.g. in the event that the user falls) to safely bring the user to a halt. Fall-protection apparatus such as self-retracting lifelines and components and functioning thereof are described in various aspects in U.S. Pat. Nos. 7,843,349, 8,256,574, 8,430,206, 8,430,207, and 9,488,235. In some embodiments fall-protection apparatus 1 is a self-retracting lifeline which meets the requirements of ANSI Z359.14-2012.

In some embodiments, a fall-protection apparatus with which a field-installable deflectable element may find use, may be e.g. a horizontal lifeline or retractable horizontal lifeline, a positioning lanyard, a shock-absorbing lanyard, a rope adjuster or rope grab, a load arrester, a vertical safety system (such as e.g. a flexible cable, rigid rail, climb assist, or fixed ladder safety system), a confined-space rescue system or hoist system, and so on. Any such fall-protection apparatus may include, or be used with, various ancillary items which are not described in detail herein. Such items may include, but are not limited to, one or more of lanyards, centrifugal brakes, shock absorbers, tear strips, harnesses, belts, straps, paddings, tool holsters or pouches, impact indicators, carabiners, D-rings, anchorage connectors, and the like. Many such apparatus, products, and components are described in detail e.g. in the 3M DBI-SALA Full-Line Catalog (Fall 2016).

Load-bearing cable 20 of apparatus 1 may take any suitable form. By load-bearing is meant that in ordinary use of a fall-protection apparatus 1 with which cable 20 is used, cable 20 is capable of bearing a load imparted by a human user (e.g. an adult human weighing at least 130 pounds) of the fall-protection apparatus. It will be appreciated that in some circumstances (e.g., when used to arrest a fall), cable 20 may at least momentarily bear a dynamic load that is somewhat greater than the actual weight of the human user.

Cable 20 may take any form and may be made of any suitable material. In some embodiments, cable 20 may be a metal cable, e.g. a twisted or braided metal cable (often referred to as a wire rope). Suitable materials for a metal cable may include e.g. stainless steel and galvanized steel. In other embodiments, cable 20 may take the form of a rope comprised of twisted or braided organic polymeric strands, plies, or fibers. Such a cable may be comprised of any suitable organic polymer or polymers, and in particular embodiments may be comprised of aramids, nylons, polyesters, and so on. It will thus be understood that the term cable is used broadly and does not imply any particular composition or geometry, as long as the cable is load-bearing as described above.

In many embodiments, cable 20 may exhibit an at least generally circular cross-section. In other embodiments, at least a portion of cable 20 that is proximal to first end 21 of cable 20 (and that may include first end 21), may take the form of a lanyard comprised of webbing that exhibits a cross-section with a relatively high aspect ratio of width to thickness. Such a lanyard/webbing may be comprised of any suitable material, e.g. any of the organic polymeric materials listed above. Such a lanyard may provide the entire length of cable 20; or, it may provide only a first-end portion of cable 20 and may be coupled to a length of wire rope or polymeric rope that provides the majority of the length of cable 20. It will thus be appreciated that the concept of a cable 20 embraces multisegment arrangements (e.g. a terminal lanyard joined to a wire rope). Cable 20 may have any suitable length.

A first end 21 of cable 20 comprises at least one connector 100 (as shown in exemplary embodiment in FIGS. 1 and 2) which enables first end 21 of cable 20 to be connected to any desired item, e.g. to a harness of a user of apparatus 1 or to an anchorage connector. Connector 100 may take any suitable form. As shown in exemplary embodiment in the isolated view of FIG. 3, in some embodiments connector 100 may comprise a fastener 40 that comprises a hook portion 41 with a main body 44 and with a gate 43 hingedly attached thereto. In some embodiments gate 43 may be thumb- or finger-actuatable. In some embodiments fastener 40 may be self-engaging, meaning that fastener 40 may be engaged to an item (e.g. a D-ring of a wearable harness) by pressing hingedly openable gate 43 of fastener 40 against the item so that gate 43 opens in response to the pressing force. In some embodiments, the hinged gate may be biased (e.g. spring-loaded) to snap shut after allowing passage of a component of the item through the gap created when the gate is opened; in such cases the fastener may be self-locking (automatically locking). Any such fastener (whether self-locking or not) may be thumb or finger-actuatable to open gate 43 to enable the fastener to be disengaged from the item. Many such fasteners may allow one-handed operation.

Figure 3:
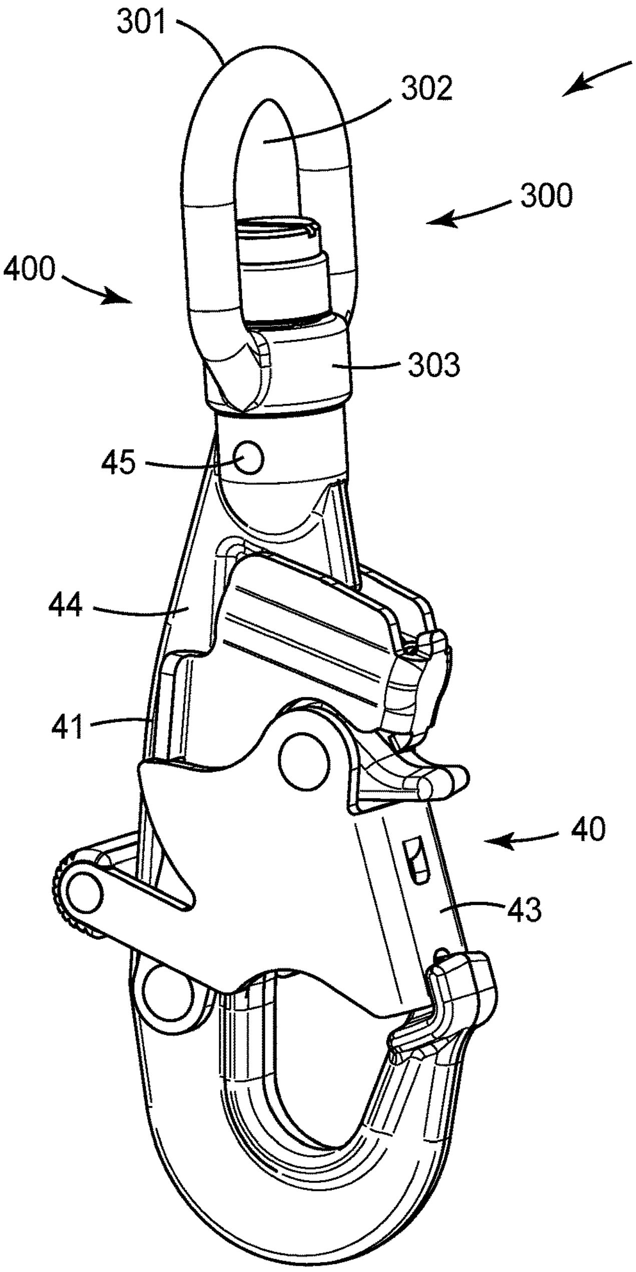
FIG. 3 is a side perspective view of an exemplary connector.
Figure 4:
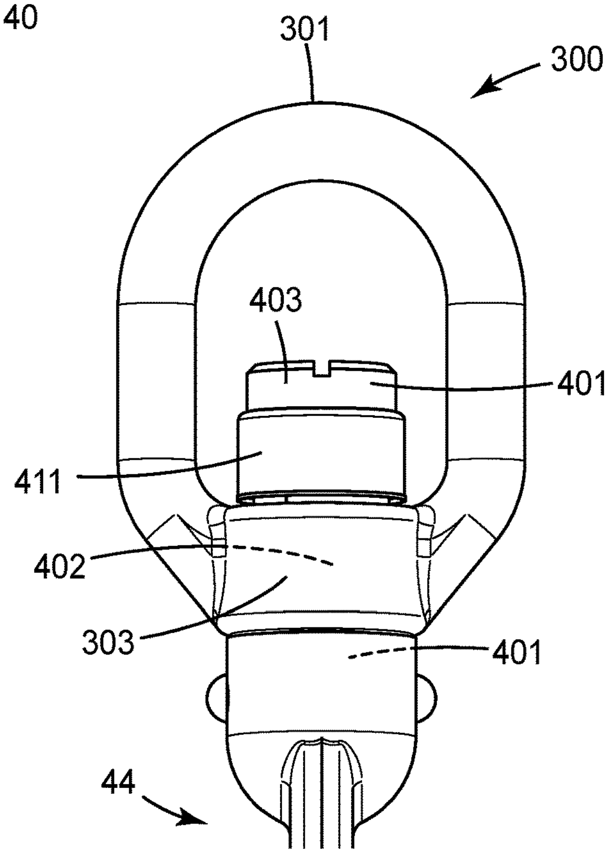
FIG. 4 is an isolated view of an exemplary linking assembly of a connector, with a factory-installed deflectable element in place.

In some embodiments, connector 100 may comprise a linking assembly 300 by which first end 21 of cable 20 is linked (i.e. connected) to connector 100. As shown in FIG. 4, in some embodiments such a linking assembly 300 may comprise a linker 301 that is attached to fastener 40 by a bolt 401. Bolt 401 may comprise a head 403 and a shaft 402 that extends through an aperture in base 303 of linker 301 and that is attached to main body 44 of hook portion 41 of fastener 40. Shaft 402 of bolt 401 may be attached to main body 44 in any suitable way, e.g. by the use of a rivet 45 as shown in FIG. 3, by complementary threads, by welding, by an adhesive, or by any combination of any of these. Linker 301 and bolt 401 may be configured so that linker 301 is swivelable relative to fastener 40; that is, linker 301 may be rotatable about an axis of rotation that is aligned with a long axis of bolt 401. In many embodiments, linker 301 will be non-removably attached to fastener 40. In many embodiments, at least some components of connector 100 may be made of metal, e.g. steel, brass, or the like.

Figure 2:
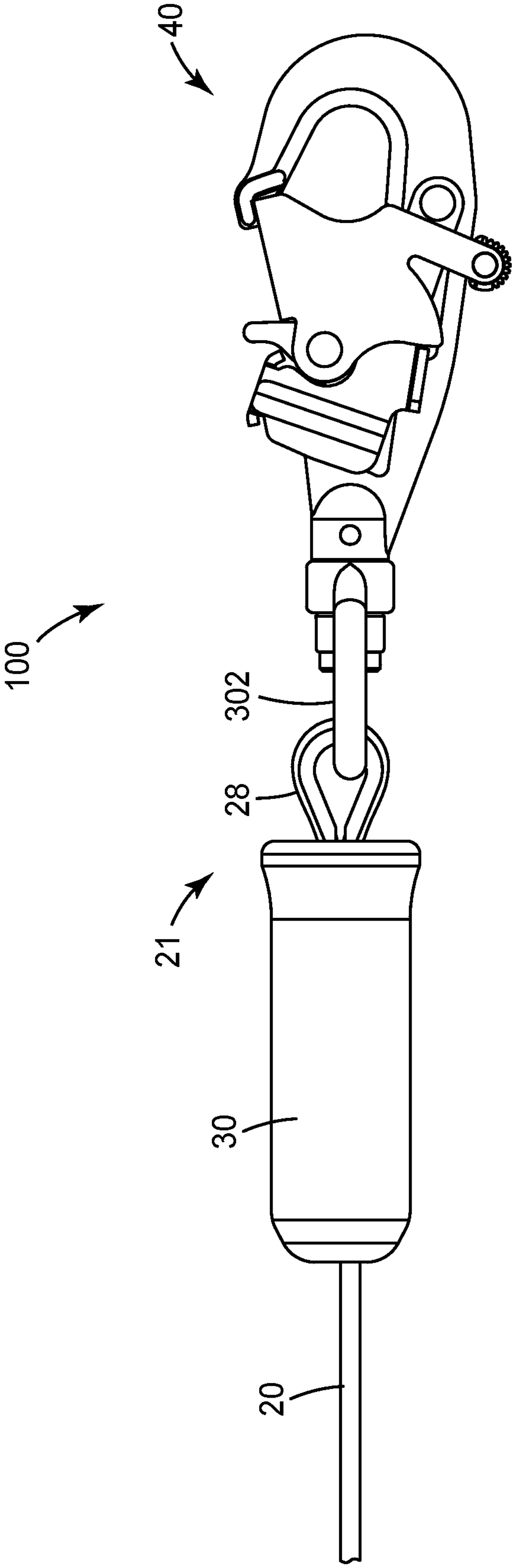
FIG. 2 is a side view of a first end of a cable of an exemplary fall-protection apparatus, comprising an exemplary connector.

Connector 100 may be secured to first end 21 of cable 20 in any suitable manner. Often, a connector 100 may remain with cable 20 over the life of the fall-protection apparatus unless replaced; if so, connector 100 may be non-removably secured to cable 20 rather than being configured e.g. for quick release in the field. One exemplary arrangement for securing a fastener 40 to a first end 21 of cable 20 is depicted in FIG. 2. In arrangements of this type, a terminal section of cable 20 may be passed through an aperture 302 defined by linker 301 and turned back onto itself to form a terminal loop 28 at first end 21 of cable 20, from which terminal loop 28 connector 100 extends. The terminal section of cable 20 may be brought into close abutment with a penultimate section of cable 20, and may be affixed or otherwise joined thereto. In some embodiments one or more fittings may be used for this purpose. Any suitable fitting or fittings may be used, e.g. a compression fitting in the form of a sheath, ferrule, or swage fitting.

In some embodiments (e.g. when at least a terminal portion of cable 20 comprises an organic polymeric rope), a terminal section of cable 20 may be joined to a penultimate section of cable 20 by being spliced thereto e.g. to form an eye splice. This may be achieved e.g. by partially untwisting strands of at least one of these sections and then interweaving, threading, or otherwise entangling strands of that section with those of the other section. In some embodiments (e.g. when at least a terminal portion of cable 20 comprises an organic polymeric webbing), a terminal section of the webbing may be joined to a penultimate section of the webbing by stitching. In some embodiments cable 20 may comprise a protective shroud 30 as shown in FIG. 2. Such a shroud, when fitted at first end 21 of cable 20 as in FIG. 2, can cover some or all of the terminal/penultimate section junction of the cable, for purposes which may be utilitarian and/or aesthetic.

As manufactured and provided to an end user, a connector 100 may comprise an impact indicator 400 as denoted in FIG. 3. Such an indicator (often referred to as a visual fall indicator) allows a user or other designated person to determine, by visual inspection, whether the fall-protection apparatus has experienced a force (e.g. due to a fall-arrest) that is above (i.e., greater than) a predetermined threshold value. Since the impact indicator is resident on connector 100, this determination may be made without necessarily having to access or inspect a base unit of the fall-protection apparatus. In many embodiments, such a connector-resident impact indicator 400 will be an unpowered indicator, meaning that it does not require electrical power of any kind in order to perform its function.

Figure 5:
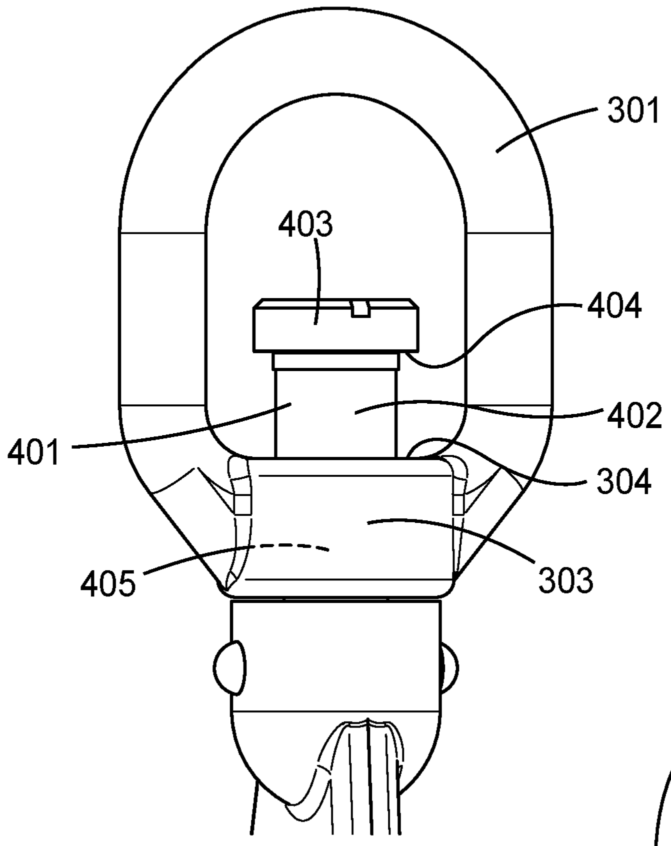
FIG. 5 is an isolated view of the exemplary linking assembly of FIG. 4, with the factory-installed deflectable element omitted.
Figure 6:
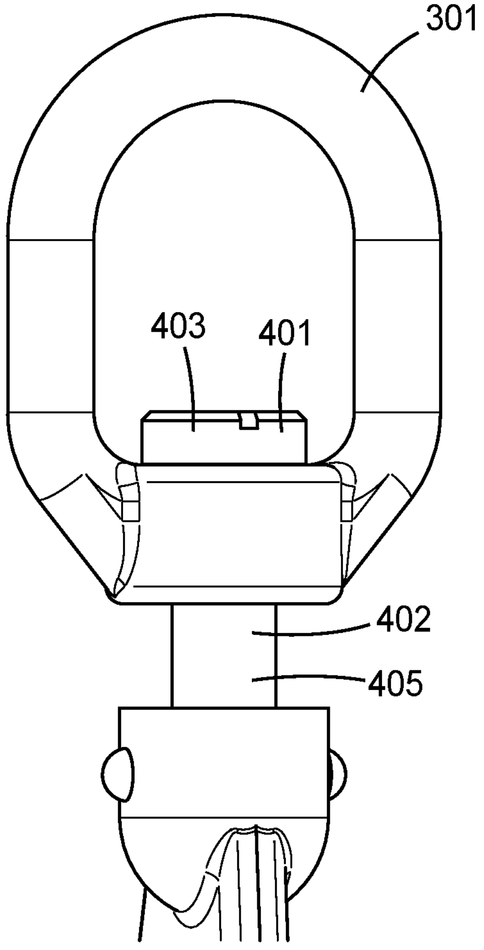
FIG. 6 is an isolated view of the exemplary linking assembly of FIG. 5, with a movable component shown having moved into a second, indicating position.

In many convenient arrangements, such an impact indicator 400 may rely in part on the above-mentioned bolt 401. As shown in FIGS. 4-6, bolt 401 may be slidably mounted in a through-aperture that extends through base 303 of linker 301. As shown in FIG. 4, impact indicator 400 may rely on a factory-installed deflectable element 411 that will deflect upon being subjected to sufficient force. For example, deflectable element 411 may be mounted on shaft 402 of bolt 401, sandwiched between lower surface 404 of bolt-head 403 and upper surface 304 of base 303 of linker 301.

With such an arrangement, a force applied to hook portion 41 of fastener 40 will cause a crushing force to be applied to element 411. Element 411 may be designed in concert with bolt 401 and linker 301 so that a sufficiently high crushing force will cause element 411 to deflect. In response to such a force, element 411 may deflect but remain in place on shaft 402 of bolt 401; or, element 411 may be partially or totally dislodged. Any such circumstance is encompassed by the terminology of "deflectable". By definition, a deflectable element (whether a factory-installed element or a field-installable element as described later herein) is a non-reversibly deflectable element. That is, such an element, once deflected (whether by deformation and/or dislodging), is not restorable to its original, undeflected condition.

The deflecting of element 411 allows bolt 401 to slidably move relative to linker 301 (downwardly, in the view of FIGS. 5 and 6) from a first position as shown in FIG. 5, to a second position as shown in FIG. 6 (noting that element 411 is omitted from both of these Figures for ease of visualizing other components). The first position will be termed a non-indicating position, meaning that a movable component (bolt 401, in the illustrated embodiment) of impact indicator 400 is in a position in which it does not indicate that indicator 400, or fall-protection apparatus 1 or any component thereof, has experienced a force above a predetermined threshold value. The second position will be termed an indicating position, by which is meant that the movable component 401 of impact indicator 400 is in a position that indicates that indicator 400, and thus fall-protection apparatus 1, may have experienced a force above the predetermined threshold value. (The movable component 401 being in this position will be referred to herein as the impact indicator having been "activated"). Movable component 401 being reversibly movable (in the absence of a deflectable element that physically blocks the movable component from moving), it will be understood that e.g. if deflectable element 411 has been completely dislodged, movable component 401 may be able to freely move between the first and second positions. Given this, an instance in which component 401 is observed as being in the first position but is observed to be able to freely slide between the first and second positions, will be equated with component 401 being in the second, indicating position.

In some embodiments the position of a movable component of an impact indicator, e.g. the position of a bolt 401 relative to a linker 301, may serve as the basis for ascertaining whether the movable component is in a first, non-indicating position or a second, indicating position (i.e. whether the impact indicator has been activated). Arrangements of this general type are discussed e.g. in U.S. Patent Application Publication 2017/0291049, in particular with reference to FIGS. 9, 10A and 10B of the '049 Publication. However, in some embodiments a movable component of an impact indicator may comprise an indicating portion that is hidden when the movable component is in the first position and that is visible when the movable component is in the second position. Thus in embodiments in which the movable component takes the form of a bolt 401, shaft 402 of bolt 401 may comprise an indicating portion 405 that is hidden by base 303 of linker 301 when bolt 401 is in the first position as shown in FIG. 5. When bolt 401 is in the second position, indicating portion 405 will be visible as shown in FIG. 6. In some embodiments, indicating portion 405 of shaft 402 may be provided with a color (e.g. red) that is easily visible and that differs from the color of linker 301 and/or fastener 40. In some embodiments, such an indicating portion 405 may be provided e.g. by painting or otherwise coloring the desired portion of shaft 402. In some embodiments indicating portion 405 of shaft 402 may take the form of a colored (e.g. painted or dyed) sleeve that is fitted around the desired portion of shaft 402. Such a sleeve may also serve as bushing that, when bolt 401 is in the first position, enhances the ease of rotation of linker 301 about shaft 402.

In many fall-protection products as manufactured, a deflectable element 411 may be a factory-installed element (e.g. a "crush-ring", made of brass or some other suitable metal). Such an element will typically be slidably mounted on shaft 402 of bolt 401 before shaft 402 is attached to fastener 40. In fact, such an element cannot be installed on bolt 401 after bolt 401 is attached to fastener 40. That is, a deflectable element 411 must be installed during manufacture of connector 100 and is not field-installable or field-replaceable.

Figure 7:
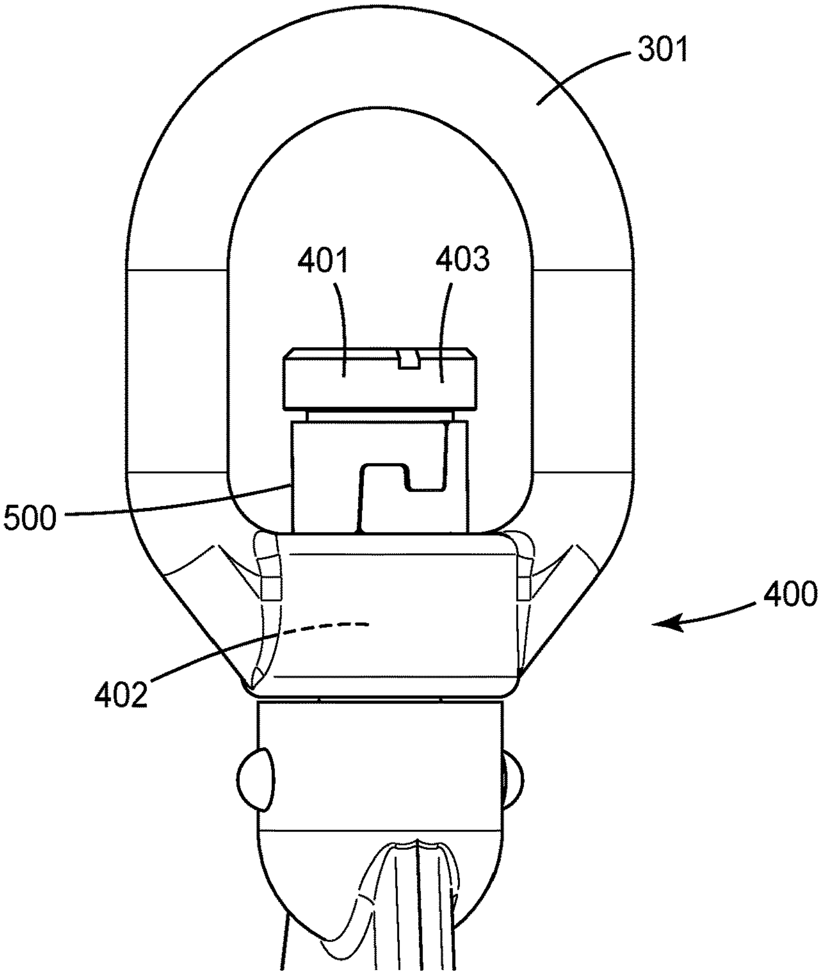
FIG. 7 is an isolated view of the exemplary linking assembly of FIGS. 4 and 5, with a field-installable deflectable member having been installed as a replacement for the factory-installed deflectable element.
Figure 8:
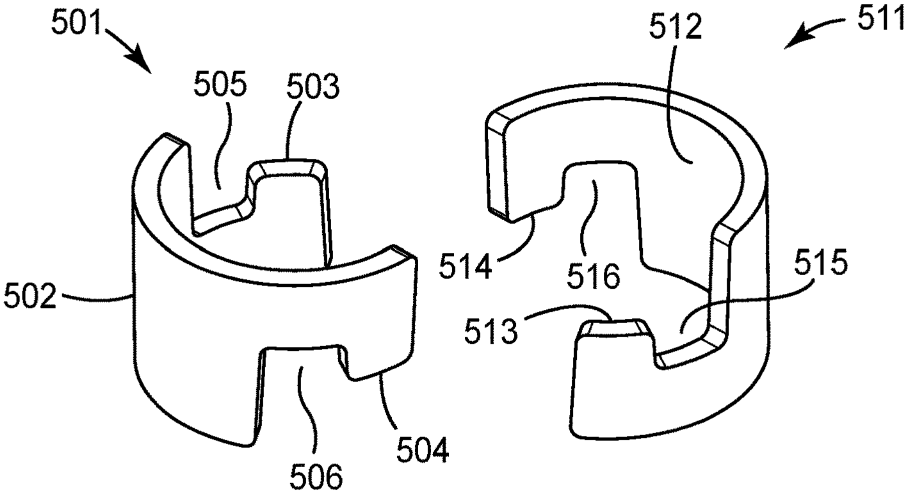
FIG. 8 is an isolated exploded view of the field-installable deflectable member of FIG. 7.
Figure 9:
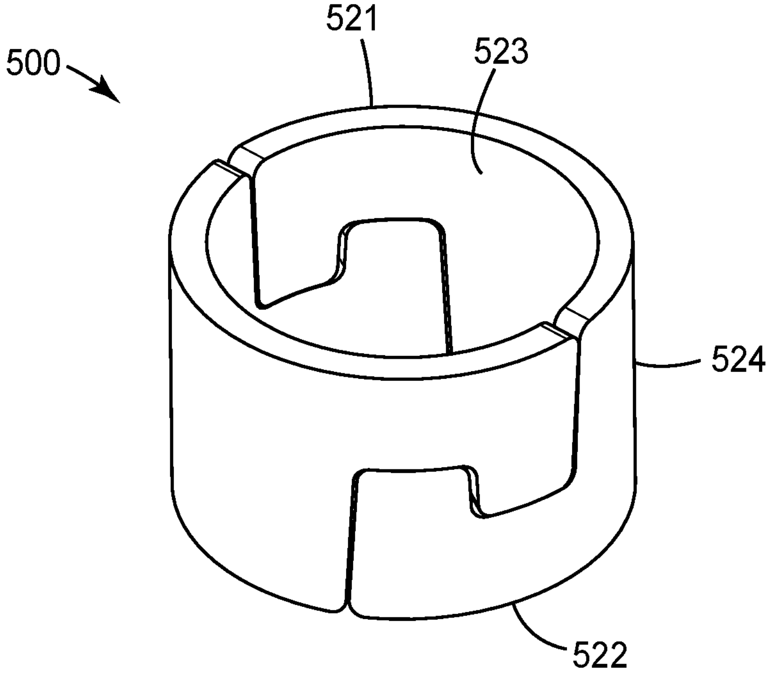
FIG. 9 is an isolated assembled view of the field-installable deflectable member of FIG. 7.
Figure 10:
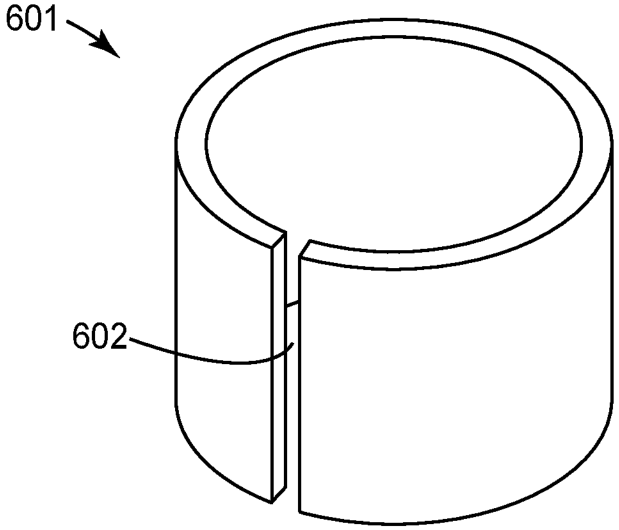
FIG. 10 is an isolated view of another exemplary field-installable deflectable member.

Disclosed herein, and shown in exemplary embodiment in FIGS. 7-9, is a deflectable element 500 that is field-installable. By field-installable is meant that element 500, and connector 100 with which it is used, are configured to enable and facilitate installation of element 500 by a user or other authorized person in the field, without necessitating the return of connector 100 (or fall-protection apparatus 1 of which it is a component) to the factory (or other authorized facility) for service. By field-installable is also meant that element 500 can installed manually (by hand), without the need for any special tools or fixtures. An artisan of ordinary skill in the art of fall-protection devices will, upon examination of an impact indicator, be able to identify the indicator as having deflectable element that is field-installed. Furthermore, the artisan will be able to distinguish such an impact indicator from those impact indicators that rely on factory-installed deflectable elements as used in the art.

In the exemplary embodiment depicted in FIGS. 7-9, such arrangements are achieved by providing first and second pieces 501 and 511 that fit together to collectively provide a deflectable element 500 that is in the general form of a sleeve, sheath, ferrule, band, tube, ring, or the like. In the depicted embodiment, deflectable element 500 is in the form of an at least generally cylindrical sleeve. Thus, with bolt 401 placed in its first, non-indicating position, pieces 501 and 511 can be snapped into position on shaft 402 of bolt 401, between the lower surface 404 of bolt-head 403 and the upper surface 304 of linker-base 303, to provide the arrangement shown in FIG. 7. Bolt 401 and field-installed sleeve 500 thus collectively provide an impact indicator 400, with bolt 401 serving as the movable component and sleeve 500 serving as the deflectable element.

In some embodiments, first and second pieces 501 and 511 may be molded (e.g. injection molded) of any suitable organic polymeric material. In some embodiments, first and second pieces 501 and 511 may be identical to each other. In some embodiments, the first and second pieces may be sized and shaped to form an at least generally or substantially cylindrical sleeve with an inner diameter that closely matches the outer diameter of bolt-shaft 402. In other embodiments the pieces may be sized and shaped to form an at least substantially cylindrical sleeve with a nominal inner diameter that is slightly smaller (e.g. by about 5 or about 10%) than the outer diameter of bolt-shaft 402, to enhance the tightness with which the sleeve hugs bolt-shaft 402.

In some embodiments, first and second pieces 501 and 511 may fit together to form an interlocking structure. By an interlocking structure is meant a structure that, once assembled in place on shaft 402 of bolt 401, is self-sustaining. In other words, once pieces 501 and 511 are fit together into a sleeve on shaft 402, they will remain in place until they experience sufficient force to deflect them (or until they are removed by a user, e.g. for inspection or replacement). In the particular exemplary design most easily seen in FIG. 8, first piece 501 may comprise a main portion 502 and upward and downward facing tabs 503 and 504 and upward and downward facing slots 505 and 506. Second piece 511 may similarly comprise a main portion 512 and tabs 513 and 514 and slots 515 and 516. Many variations of this general type of interlocking design are possible. In some embodiments, at least some edges of the pieces may be oriented (e.g. slightly angled) so that when a force is applied to the pieces along an up-down direction (with reference to the views of FIGS. 7-9), the force will tend to drive the pieces slightly radially inward so that they hug bolt-shaft 402 more tightly.

The dimensions of pieces 501 and 511, the dimensions (e.g. the radial thickness) of the thus-formed sleeve, and the properties (e.g. modulus) of the material of which the pieces are made, can be chosen in combination so that the thus-formed element is deflectable when exposed to a force that is above a predetermined threshold value. In other words, the pieces may be chosen to provide an element with a crush strength that, for example, closely matches the crush strength of a factory-installed deflectable element (e.g. a brass crush ring) that the sleeve replaces. In various embodiments, a field-installable deflectable element 500 may exhibit a crush strength of at least 600, 700, or 800 pounds-force (thus, impact indicator 400 of which element 500 is a component may be activated when exposed to a force of this magnitude). In further embodiments, element 500 may exhibit a crush strength of at most 850, 750 or 650 pounds-force. It will be understood that any such crush strength and resulting threshold force value at which the impact indicator is activated, will be chosen in accordance with all applicable standards.

In some embodiments, field-installable deflectable element 500 may be configured to operate in a deflection mode that (e.g. at least initially) approaches pure compression. That is, such an element, when subjected to a crushing force between the bolt-head and the linker-base, may exhibit a crush strength that is close to that of a similarly sized and shaped element that is unitary rather than being assembled from two parts. In other words, pieces 501 and 511 can be configured so that upon being assembled together they perform at least generally as a unitary body even though the "body" is comprised of two parts that, while they may be interlocked as described above, are not actually joined to each other.

A field-installable deflectable component of an impact indicator need not necessarily be derived from the assembly of two (or more) pieces. Rather, in some embodiments a single-piece deflectable component may be used. For example, an at least generally cylindrical, single-piece sleeve 601 may serve as a deflectable element 500. As shown in exemplary representation in FIG. 10, in some embodiments such a sleeve may comprise a longitudinal cut-out (slot) 602 so that the piece is generally C-shaped when viewed in cross-section along its axial dimension, and may be made of any suitable resilient material. Such a sleeve can be temporarily deformed to increase the width of slot 602 to a value that is larger than the outer diameter of the portion of shaft 402 of bolt 401 on which sleeve 601 is to reside. The sleeve can then be moved into place on shaft 402 and the deformation pressure removed, to allow the sleeve to substantially return to its original (e.g. generally cylindrical, C-shaped) configuration. Such a sleeve may then serve in substantially similar manner as the two-piece sleeve described above.

In still another approach, a single-piece sleeve (e.g. without any cut-out or slot) may serve as a deflectable element 500. Such a sleeve may comprise an inner dimension (e.g. diameter) that is large enough to allow the sleeve to be slidably moved over bolt-head 403. Such a sleeve may be slidably moved along the longitudinal axis of bolt 401 to reach a desired location along bolt-shaft 402. The sleeve may be made of a suitable material, and may comprise a suitably chosen geometric shape, to allow the sleeve to be crimped so that at least portions of the sleeve closely abut the desired portion of bolt-shaft 402. In some embodiments a special tool (e.g. crimping pliers) may be provided to facilitate such operations. This special case is an exception to the above-noted condition that a field-installable deflectable element will not require any special tools for installation; a crimpable sleeve is still considered to be field-installable as disclosed herein. Also, such a sleeve, after being subjected to a crimping operation, may not necessarily be strictly cylindrical in shape. Rather, it may comprise one or more fold lines, furrows, pleats, or the like, as imparted by a crimping process.

From the above discussions it will be appreciated that a field-installable deflectable element may comprise any suitable shape and form, may be made from any suitable material (e.g. molded plastic or shaped metal such as stamped sheet metal), and may comprise a single piece or may be assembled from multiple pieces. All such arrangements are encompassed within the concept of a field-installable deflectable element. Furthermore, any such deflectable element, although often referred to for convenience as a "sleeve", need not be strictly cylindrical. That is, any such sleeve, when viewed in cross-section at any point along its length, need not necessarily exhibit an uninterrupted, strictly circular shape. In fact, in some embodiments a field-installable deflectable element need not take the form of a sleeve, sheath, ring or the like. For example, an impact indicator might comprise a deflectable element in the form of one or more shear pins that are arranged in combination with one or more reversibly movable elements. Thus in some embodiments, a field-installable deflectable element may be a shear pin. In other embodiments, a field-installable deflectable element may comprise a Belleville washer (i.e. a conical spring washer), or a stack of such washers.

In some embodiments, a field-installed deflectable element 500 may remain in place on bolt-shaft 402 after being deflected. In other embodiments, element 500 may be dislodged from shaft 402 upon being deflected. In some embodiments element 500 may be substantially or heavily deformed when deflected; in some embodiments element 500 may fracture, rupture, or shatter into multiple fragments. All such cases, variations and combinations are encompassed by the term "deflectable". Regardless of the exact condition of element 500 after deflection, element 500 is non-reversibly deflectable and is not restorable to its pre-deflected condition.

In some embodiments, an impact indicator 400 that is resident on a connector 100, and that is configured to accept a field-installable deflectable element 500, may be used in combination with a secondary impact indicator. In some embodiments, such a secondary impact indicator may not be resident on connector 100. For example, such a secondary impact indicator may be an indicator 60 that is resident on a base unit 50 (e.g. on a housing 51 thereof) of fall-protection apparatus 1, as shown in exemplary embodiment in FIG. 1. By resident on base unit 50 is meant that secondary impact indicator 60 relies on at least one sensor 61 that is resident on or in housing 51 and that is configured to monitor at least one parameter that allows a determination of whether fall-protection apparatus 1 has experienced a force above a predetermined threshold value. As will be evident from the detailed discussion that follows, this does not require that the entirety of, or even the majority of, the components, processors, etc. that collectively provide indicator 60 must be resident on base unit 50 or on/in housing 51 thereof. Rather, in many embodiments sensor 61 may transmit (e.g. wirelessly transmit) data to a receiving unit that is not located on base unit 50. Such a receiving unit (or any entity in communication therewith) may process such data to reach a determination of whether apparatus 1 has experienced a force above a predetermined threshold value, may provide an indication of such a determination, and so on.

In many embodiments, a secondary impact indicator 60 may be a powered indicator, meaning that it requires electrical power to function. In many embodiments, sensor 61 and secondary impact indicator 60 (and a receiving unit if present) may be components of an electronic datalogging system that is configured to obtain and/or record data at least during the operation of fall-protection apparatus 1. Such a datalogging system may, for example, monitor the usage and operating condition of apparatus 1, may monitor the movements of a user of the apparatus, and so on, in many aspects and for various purposes, e.g. for the generation of safety models and/or for the prediction of occurrences of safety events. It will thus be appreciated that in many embodiments, the providing of a secondary impact indicator may only be one operation among many that may be performed by such a datalogging system. Datalogging systems, components thereof, and the various uses to which they may be put in relation to fall-protection apparatus are discussed in detail in U.S. Patent Application Publication No. 2018/0107169, which is incorporated by reference in its entirety herein.

An impact indicator 400 that is resident on a connector 100 and that is configured to accept a field-installable deflectable element 500, and a secondary impact indicator that, for example, is not resident on connector 100 (e.g. that is resident on a base unit 50 of the fall-protection apparatus), may be advantageously used in combination. For example, a connector-resident impact indicator 400 may be configured to be activated when a force is experienced by the apparatus that is above a first predetermined value. The secondary impact indicator may be configured to be activated when a force is experienced by the apparatus that is above a second predetermined value that is above the first predetermined value (e.g., by a factor of at least 10, 20, 30, or 40 percent). The arrangements disclosed herein thus allow a determination that a force was experienced by a fall-protection apparatus that was above a first predetermined value that was sufficient to activate the connector-resident impact indicator, but that was not above a second predetermined value that would call for the fall-protection apparatus to be returned to the factory for service. Such a force might result, for example, from a particularly strong tug on the load-bearing cable of the apparatus as a part of a "lock-up" test, from a user of the apparatus stepping quickly off a ladder, or the like, as will be well understood by those of ordinary skill in such operations.

Thus, upon a visual inspection of a connector-resident impact indicator 400 revealing that impact indicator 400 has been activated, a secondary impact indicator 60 may be consulted (whether by a user of the fall-protection apparatus, or by a safety manager or other authorized person). If the secondary impact indicator reveals that a force above the second predetermined value has been experienced, the fall-protection apparatus may be e.g. returned to the factory for inspection and servicing as needed. However, in some instances the secondary impact indicator may reveal that a force above the second predetermined value was not experienced, therefore there may be no need to return the apparatus to the factory. In such a circumstance, the movable component of connector-resident impact indicator 400 may be returned to its first, non-indicating position and a field-installable deflectable element 500 may be installed in the manner described above (in other words, the connector-resident impact indicator 400 may be restored to its inactivated condition). The fall-protection apparatus may then be put back into active use at the worksite. Thus, there may be no need to take the apparatus out of use and return it to the factory.

Those of ordinary skill in the art will appreciate that significant advantages can result from such arrangements. For example, a connector-resident impact indicator 400 may be inspected e.g. every morning, at the start of every work shift, and/or when a different user begins use of fall-protection apparatus 1. In such instances, a connector-resident impact indicator 400 may be easily visually inspected without any need to access or inspect a base unit of the fall-protection apparatus. This is particularly advantageous when the fall-protection unit is a self-retracting lifeline, in which case the base unit/housing of the apparatus may be located at an elevated, hard-to-reach location, while the load-bearing cable of the apparatus may be extended from the base unit so that connector 100 of the apparatus is at a lower, easily accessible location. If inspection reveals that impact indicator 400 has been activated, the secondary impact indicator may be consulted in the manner described above, to determine whether the apparatus should returned to the factory for servicing or whether the connector-resident impact indicator can be restored to its inactivated condition and the apparatus returned to active use at the worksite. It will be appreciated that such arrangements rely not only on the presence of a secondary impact indicator, but also are predicated on the herein-disclosed concept of a field-installable replacement deflectable component of a connector-resident impact indicator.

In various embodiments, a sensor 61 that is used by secondary impact indicator 60 can rely on any suitable sensing mechanism. In some embodiments, such a sensor may be configured to monitor any movement of a brake disk of a centrifugal brake that is resident in a housing 51 of a base unit 50 of a self-retracting lifeline. That is, the distance that a brake disk has rotatably moved may be monitored (whether continuously or intermittently) and used to infer a force that the fall-protection apparatus has experienced. Thus, while in some instances a sensor 61 may be e.g. a load cell, strain gauge, tension sensor or some similar device that directly measures a force on cable 20 or on reel 23 to which cable 20 is attached, in some embodiments a sensor 61 may not necessarily measure such a force directly. In some embodiments, a sensor 61 may monitor a rotational position, rotational displacement, rotational speed, and/or a change in rotational speed (e.g. acceleration) of reel 23 to which cable 20 is attached. In some embodiments, a sensor 61 may monitor a linear position, linear displacement, linear speed, and/or a change in linear speed (e.g. acceleration) of cable 20 e.g. at or near a position at which cable 20 enters housing 51 of base unit 50. Any such data, manipulated or processed in any suitable manner, may be used to calculate or otherwise infer a force that has been experienced by the apparatus.

In some embodiments a secondary impact indicator 60 may rely on data from more than one sensor 61 and/or data of more than one type, in assessing a force that has been experienced by the fall-protection apparatus. For example, in some embodiments a secondary impact indicator may utilize disk-brake displacement data in combination with data regarding the speed or acceleration of a reel to which the load-bearing cable is attached, in making such an assessment.

While discussions herein have referred to the secondary impact indicator 60 being activated (meaning that it detects or infers that a force has exceeded a second predetermined threshold value), it will be understood that this does not imply that secondary impact indicator 60 must be of similar construction, or must function in the same way, as connector-resident impact indicator 400. That is, secondary impact indicator 60 need not be of a type that is activated only if a particular threshold value is reached and that can report no information other than that the threshold value was exceeded. Rather, secondary impact indicator 60 may monitor or otherwise infer a force to which the fall-protection apparatus is exposed, regardless of the actual value of the force in relation to the above-described first and second predetermined threshold values. Thus in general, secondary impact indicator 60 and sensor 61 thereof may be part of a datalogging system that monitors any of various parameters e.g. continuously or intermittently, and records various parameters regardless of whether or not the parameter is above or below any particular threshold value. A parameter (e.g. force) that rises above (or falls below) a particular value may trigger an indication or alert, which will correspond to the secondary impact indicator being activated. Such an alert may be broadcast or communicated e.g. to a receiving station in any suitable manner, e.g. by wireless communication or the like. Some or most of the actual data processing that causes a secondary impact indicator to reach an indication, and the broadcasting or accessing of an indication alert, may occur at location that is remote from the base unit of the apparatus, e.g. at a receiving unit that receives data from sensor 61. As noted above, a secondary impact indicator may be a component or function of an electronic system that performs various other tasks such as monitoring and/or datalogging of various operating parameters of the fall-protection apparatus. That is, the secondary impact indicator may be a functional module of the electronic system.

In some embodiments a secondary impact indicator may be only one of a plurality of functional modules of the electronic system, which functional modules may monitor, assess, report, etc., various aspects of the condition, use or performance of the fall-protection apparatus. In some embodiments the fall-protection apparatus may be only one apparatus of a plurality of personal protective equipment (PPE) apparatus whose condition, use or performance may be monitored by a system. Such PPE apparatus may include apparatus of one or more different types (e.g., respiratory protection) other than fall-protection, and/or may comprise communication units so that information may be communicated e.g. to a receiving unit of the system. Such systems and their use, and ways in which PPE apparatus can be configured for use in such systems, are described in U.S. Provisional Patent Application Nos. 62/556,771 and 62/639,958, which are incorporated by reference in their entirety herein.

Various types and operating mechanisms of sensors that may find use e.g. as a component of a secondary impact indicator; devices, systems and methods for performing datalogging, for transmitting data to receiving units, for outputting reports of operating conditions and events; and so on, are described in U.S. Patent Application Publication No. 2018/0107169, and in U.S. Provisional Patent Application No. 62/408,634 and PCT Application Publication WO 2017/223476, all of which are incorporated by reference herein in their entirety. Systems and methods for monitoring the position, displacement, speed, acceleration and so on of a chosen component or components of a fall-protection apparatus (e.g. a reel), for example by the use of magnetic sensing arrangements, are disclosed in U.S. Provisional Patent Application No. 62/543,564, which is incorporated by reference herein in its entirety. Various exemplary types and configurations of centrifugal brakes that may be used with a fall-protection apparatus such as a self-retracting lifeline (and whose condition, e.g. position or displacement, may be monitored in order to provide a second impact indicator) are described in U.S. Pat. No. 8,430,207 and in U.S. Provisional Patent Application Nos. 62/459,724 and 62/531,984, all of which are incorporated by reference herein in their entirety. In some embodiments, a connector-resident impact indicator as disclosed herein (e.g. that is configured to accept a field-installable replacement deflectable element) may be a primary indicator that is used in combination with a secondary impart indicator that is also resident on the connector. For example, such a secondary indicator might comprise a deflectable element (e.g. a crush ring) that requires a higher force to be deflected (e.g., that has a higher crush strength) in comparison to the primary indicator.

It will be appreciated that such secondary impact indicator, if present, may be accessed or inspected, may trigger a notification that fall-protection apparatus 1 has experienced a force above a predetermined threshold value, and so on, irrespective of whether or not the connector-resident impact indicator has been inspected or found to have been activated. That is, such a secondary impact indicator may function, be consulted, report an indication, and so on, independently of any role that it may play in augmenting information provided by a connector-resident impact indicator. It will be understood that the configuration and use of any connector-resident impact indicator (and any secondary impact indicator if present), will be in accordance with all applicable standards. In particular, any resetting of a connector-resident impact indicator to a first, unactivated condition (for example, the installation of a field-installable replacement deflectable element) will be performed in accordance with instructions provided by the manufacturer of the fall-protection apparatus as well as being in accordance with any standards that may apply.

From the above discussions it will be appreciated that the availability of a field-installable deflectable element for a connector-resident impact indicator (regardless of the particular design of the impact indicator and/or the deflectable element) allows such a connector-resident impact indicator to be advantageously used in combination with a secondary impact indicator that, for example, is not resident on the connector. Specifically, information from the secondary impact indicator can provide that in some instances a connector-resident impact indicator that has been activated can be reset into a first, non-indicating condition (i.e., the movable element of the connector-resident impact indicator can be moved to its first, non-indicating position and a field-installable deflectable element can then be installed).

The arrangements disclosed herein make it possible to provide fall-protection apparatus, and/or field-installable replacement deflectable elements, e.g. in the guise of a kit that includes instructions for responding to an occurrence in which a first, connector-resident impact indicator of a fall-protection apparatus has been activated. Such instructions may specify that if the force experienced by the apparatus was not above a second predetermined threshold value (as reported by the second impact indicator), the first, connector-borne impact indicator may be reset into a first, non-indicating condition. Such instructions may include specific procedures for moving the movable element of the connector-resident impact indicator to its first, non-indicating position and/or for field-installing a field-installable replacement deflectable element.

The terminology of "instructions" that are included with a kit, that accompany a product, and so on, encompasses instructions that are packaged with a fall-protection apparatus and/or with one or more field-installable replacement deflectable elements, whether such instructions are e.g. printed on paper, or are loaded on a CD, a flash drive, or on any other electronic or optically readable medium. This terminology also specifically encompasses "virtual" instructions in the form of information that is not packaged with the physical product but is instead provided on a web site to which a user (or other authorized person) of the product is directed to obtain such information, or is provided on a smartphone application to which the user (or other authorized person) is directed to obtain such information, or any like arrangement.

LIST OF EXEMPLARY EMBODIMENTS

Embodiment 1 is a fall-protection apparatus, comprising: a load-bearing cable with a first end comprising a connector comprising an impact indicator comprising a component that is reversibly movable from a first, non-indicating position to a second, indicating position, and wherein the impact indicator comprises a deflectable element; wherein the deflectable element prevents the reversibly movable component of the impact indicator from moving from the first, non-indicating position to the second, indicating position in the absence of a force above a predetermined threshold value, and wherein the deflectable element is deflectable to allow the component to move from the first, non-indicating position to the second, indicating position upon the application of a force above the predetermined threshold value, and wherein the deflectable element is a field-installable deflectable element.

Embodiment 2 is the fall-protection apparatus of embodiment 1 wherein the reversibly movable component of the impact indicator is a bolt that connects a linker of the connector with a main body of a fastener of the connector, and wherein the field-installable deflectable element comprises first and second mated pieces that collectively form an at least generally cylindrical sleeve that radially encircles the portion of the shaft of the bolt.

Embodiment 3 is the fall-protection apparatus of embodiment 2 wherein the first and second pieces of the deflectable element are interlocking pieces that, once mated to form the at least generally cylindrical sleeve that radially encircles the portion of the shaft of the bolt, remain mated in the form of the cylindrical sleeve unless deflected.

Embodiment 4 is the fall-protection apparatus of embodiment 1 wherein the reversibly movable component of the impact indicator is a bolt that connects a linker of the connector with a main body of a fastener of the connector, and wherein the field-installed deflectable element comprises an at least generally cylindrical sleeve comprising a longitudinal slot so that the sleeve exhibits a generally C-shaped cross-section, and wherein the sleeve is deformable into an open position in which it can be snapped onto a portion of a shaft of the bolt to form to at least partially radially encircle the portion of the shaft of the bolt.

Embodiment 5 is the fall-protection apparatus of embodiment 1 wherein the reversibly movable component of the impact indicator is a bolt that connects a linker of the connector with a main body of a fastener of the connector, and wherein the field-installed deflectable element is formed from a sleeve that is slidably movable along a longitudinal axis of the bolt into a position in which the sleeve radially outwardly abuts a portion of a shaft of the bolt, and wherein at least a portion of the sleeve is radially-inwardly deformable to deform the sleeve into a crimped configuration in which at least a portion of the sleeve closely encircles the portion of the shaft of the bolt.

Embodiment 6 is the fall-protection apparatus of any of embodiments 1-5, the fall-protection apparatus further comprising a base unit with which a second end of the load-bearing cable is engaged.

Embodiment 7 is the fall-protection apparatus of embodiment 6, wherein the fall-protection apparatus is a self-retracting lifeline and wherein the base unit comprises a housing and a reel that is rotatably connected to the housing, and wherein a second end of the load-bearing cable is attached to the reel of the base unit of the self-retracting lifeline.

Embodiment 8 is the fall-protection apparatus of any of embodiments 1-7 wherein the connector comprises a fastener comprising a hook portion with a main body with a hingedly openable gate hingedly connected thereto, and wherein the connector comprises a linking assembly comprising a linker that is swivelably connected to the fastener by a bolt that is attached to a main body of a hook portion of the fastener and wherein the load-bearing cable is secured to the linker.

Embodiment 9 is the fall-protection apparatus of any of embodiments 1-8 wherein the reversibly movable component of the impact indicator is a bolt that connects a linker of the connector with a main body of a fastener of the connector, wherein the bolt is reversibly slidably movable relative to the linker, between the first, non-indicating position and the second, indicating position.

Embodiment 10 is the fall-protection apparatus of embodiment 9 wherein an indicating portion of a shaft of the bolt is hidden by a base portion of the linker when the bolt is in the first, non-indicating position; and, wherein the indicating portion of the shaft of the bolt is visible when the bolt is in the second, indicating position, and wherein the indicating portion of the shaft comprises an indicating color.

Embodiment 11 is a method of using a fall-protection apparatus comprising a load-bearing cable with a first end comprising a connector, the method comprising: inspecting a connector-resident impact indicator of the fall-protection apparatus to determine whether a reversibly movable component of the impact indicator is in a first, non-indicating position or is in a second, indicating position that indicates that a force above a first predetermined threshold value was experienced by the apparatus; if the movable component is in the second, indicating position, consulting a secondary impact indicator to determine whether the force experienced by the apparatus was above a second predetermined threshold value that is higher than the first predetermined threshold value; if the secondary impact indicator indicates that the force was not above the second predetermined threshold value, moving the reversibly movable component of the impact indicator to its first, non-indicating position and installing a field-installable deflectable element on the connector so that the field-installable deflectable element and the movable component collectively provide a connector-resident impact indicator that is in a first, non-indicating condition.

Embodiment 12 is the method of embodiment 11 further comprising the step of removing a deflected factory-installed deflectable element from the connector before installing the field-installable deflectable element on the connector as a replacement for the factory-installed deflectable element.

Embodiment 13 is the method of any of embodiments 11-12 wherein the fall-protection apparatus is a self-retracting lifeline comprising a base unit with a housing and a reel that is rotatably connected to the housing, and wherein a second end of the load-bearing cable is attached to the reel of the base unit of the self-retracting lifeline, and wherein the secondary impact indicator comprises at least one sensor that is resident in the housing of the base unit.

Embodiment 14 is the method of embodiment 13 wherein the at least one sensor that is resident in the housing comprises at least one sensor is chosen from the group consisting of a position sensor, a displacement sensor, a speedometer, an accelerometer, a tension sensor, a load cell, and a strain gauge.

Embodiment 15 is the method of embodiment 13 wherein the at least one sensor that is resident in the housing comprises at least one displacement sensor that is configured to sense a rotational displacement of a brake disk of a centrifugal brake that is mounted in the housing.

Embodiment 16 is the method of any of embodiments 13-15 wherein the at least one sensor that is resident in the housing comprises at least one sensor that monitors a rotational speed of the reel and/or monitors a speed at which the load-bearing cable is moving.

Embodiment 17 is the method of any of embodiments 13-16 wherein the at least one sensor is a component of a datalogging system that is configured to record data at least during the operation of the fall-protection apparatus, and wherein the datalogging system is configured to report an indication, based on data from the at least one sensor, of whether a force experienced by the apparatus was above the second predetermined threshold value.

Embodiment 18 is the method of embodiment 17 wherein the datalogging system is configured to report the indication of whether the force experienced by the apparatus was above the second predetermined threshold value to a receiving unit that is not resident on the base unit of the fall-protection apparatus.

Embodiment 19 is the method of any of embodiments 11-18 wherein the step of inspecting the connector-resident impact indicator is performed with the load-bearing cable extended from the base unit so that the connector at the first end of the load-bearing cable is at least 3 meters away from the base unit.

Embodiment 20 is the method of any of embodiments 11-12 and 19 wherein the secondary impact indicator is not resident on the connector of the fall-protection apparatus.

Embodiment 21 is the method of any of embodiments 11-20 performed using the fall-protection apparatus of any of embodiments 1-10.

Embodiment 22 is a fall-protection apparatus, comprising: a load-bearing cable with a first end comprising a connector and with a second end is attached to a reel of a base unit of the fall-protection apparatus; wherein the apparatus comprises a first impact indicator that is resident on the connector of the first end of the load-bearing cable and a second impact indicator that is resident on the base unit of the fall-protection apparatus; wherein the first impact indicator is configured to indicate whether a force experienced by the apparatus was above a first predetermined threshold value and wherein the second impact indicator is configured to indicate whether the force experienced by the apparatus was above a second predetermined threshold value that is higher than the first predetermined threshold value.

Embodiment 23 is the fall-protection apparatus of embodiment 22 wherein the fall-protection apparatus is accompanied by instructions specifying that if the second impact indicator indicates that the force experienced by the apparatus was not above the second predetermined threshold value, the first impact indicator may be reset into a first, non-indicating condition.

Embodiment 24 is the fall-protection apparatus of any of embodiments 22-23 wherein the first, connector-resident impact indicator is an unpowered, visual indicator comprising a component and wherein the second, base unit-resident impact indicator is a powered indicator that is a component of an electronic datalogging system.

Embodiment 25 is a field-installable deflectable element configured to be installed as a replacement for a deflected factory-installed deflectable element of a connector-resident impact indicator of a fall-protection apparatus.

Embodiment 26 is a kit comprising: a fall-protection apparatus comprising a load-bearing cable with a first end comprising a connector comprising an impact indicator, the impact indicator comprising a component that is reversibly movable from a first, non-indicating position to a second, indicating position and comprising a factory-installed deflectable element; and at least one field-installable replacement deflectable element that is configured to be field-installed on the connector of the load-bearing cable as a replacement for the factory-installed deflectable element; wherein the kit includes instructions for moving the reversibly movable component of the impact indicator to the first, non-indicating position and for field-installing the replacement deflectable element.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. The description of certain embodiments as optional is for emphasis and does not imply that other embodiments are not optional. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

What is claimed is:

1. A fall-protection apparatus, comprising:

a load-bearing cable with a first end comprising a connector comprising an impact indicator comprising a component that is reversibly movable from a first, non-indicating position to a second, indicating position, and wherein the impact indicator comprises a deflectable element;

wherein the deflectable element prevents the reversibly movable component of the impact indicator from moving from the first, non-indicating position to the second, indicating position in the absence of a force above a predetermined threshold value, and wherein the deflectable element is deflectable to allow the component to move from the first, non-indicating position to the second, indicating position upon the application of the force above the predetermined threshold value, wherein the deflectable element is a field-installable deflectable element; and, wherein the reversibly movable component of the impact indicator is a bolt that connects a linker of the connector with a main body of a fastener of the connector, and wherein the field-installable deflectable element comprises first and second mated pieces that are identical to each other and that collectively form an at least generally cylindrical, completely hollow sleeve that radially encircles a portion of a shaft of the bolt.

2. The fall-protection apparatus of claim 1 wherein the first and second pieces of the deflectable element are interlocking pieces that, once mated to form the at least generally cylindrical sleeve that radially encircles the portion of the shaft of the bolt, remain mated in the form of the cylindrical sleeve unless deflected.

3. The fall-protection apparatus of claim 1, the fall-protection apparatus further comprising a base unit with which a second end of the load-bearing cable is engaged.

4. The fall-protection apparatus of claim 3, wherein the fall-protection apparatus is a self-retracting lifeline and wherein the base unit comprises a housing and a reel that is rotatably connected to the housing, and wherein the second end of the load-bearing cable is attached to the reel of the base unit of the self-retracting lifeline.

5. The fall-protection apparatus of claim 1 wherein the fastener comprising a hook portion with the main body with a hingedly openable gate hingedly connected thereto, and wherein the connector comprises a linking assembly comprising the linker that is swivelably connected to the fastener by the bolt that is attached to the main body of the hook portion of the fastener and wherein the load-bearing cable is secured to the linker.

6. The fall-protection apparatus of claim 1 wherein the reversibly movable component of the impact indicator is the bolt that connects the linker of the connector with the main body of the fastener of the connector, wherein the bolt is reversibly slidably movable relative to the linker, between the first, non-indicating position and the second, indicating position.

7. The fall-protection apparatus of claim 6 wherein an indicating portion of the shaft of the bolt is hidden by a base portion of the linker when the bolt is in the first, non-indicating position; and, wherein the indicating portion of the shaft of the bolt is visible when the bolt is in the second, indicating position, and wherein the indicating portion of the shaft comprises an indicating color.

8. A fall-protection apparatus, comprising:

a load-bearing cable with a first end comprising a connector comprising an impact indicator comprising a component that is reversibly movable from a first, non-indicating position to a second, indicating position, and wherein the impact indicator comprises a deflectable element;

wherein the deflectable element prevents the reversibly movable component of the impact indicator from moving from the first, non-indicating position to the second, indicating position in the absence of a force above a predetermined threshold value, and wherein the deflectable element is deflectable to allow the component to move from the first, non-indicating position to the second, indicating position upon the application of the force above the predetermined threshold value, wherein the deflectable element is a field-installable deflectable element; and, wherein the reversibly movable component of the impact indicator is a bolt that connects a linker of the connector with a main body of a fastener of the connector, and wherein the field-installed deflectable element comprises an at least generally cylindrical sleeve comprising a longitudinal slot so that the sleeve exhibits a generally C-shaped cross-section, and wherein the sleeve is deformable into an open position in which it can be snapped onto a portion of a shaft of the bolt so that the sleeve at least partially radially encircles the portion of the shaft of the bolt.

* * * * *